United States Patent
Kano et al.

(10) Patent No.: US 7,372,498 B2
(45) Date of Patent: May 13, 2008

(54) IMAGE PICKUP APPARATUS HAVING A SHUTTER CLUTCH

(75) Inventors: Shinichi Kano, Chiba (JP); Syougo Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 10/916,494

(22) Filed: Aug. 12, 2004

(65) Prior Publication Data
US 2005/0094027 A1 May 5, 2005

(30) Foreign Application Priority Data
Aug. 29, 2003 (JP) .............................. 2003-306051

(51) Int. Cl.
*G03B 7/00* (2006.01)
*H04N 5/235* (2006.01)

(52) U.S. Cl. ...................... 348/363; 348/374; 348/367

(58) Field of Classification Search ................ 348/362, 348/363, 364, 365, 366, 367, 368, 369; 396/460, 396/281, 463, 6, 65
See application file for complete search history.

(56) References Cited

U.S. PATENT DOCUMENTS

| 5,489,958 A |   | 2/1996  | Katagiri et al. |         |
|-------------|---|---------|-----------------|---------|
| 5,617,167 A |   | 4/1997  | Kaji            |         |
| 5,822,634 A |   | 10/1998 | Morishita       |         |
| 6,017,156 A | * | 1/2000  | Depatie et al.  | 396/463 |
| 6,067,423 A | * | 5/2000  | Smith et al.    | 396/281 |
| 6,442,343 B2 | * | 8/2002 | Kameyama et al. | 396/65  |
| 6,477,333 B1 |   | 11/2002 | Manabe et al.  |         |
| 6,547,457 B2 | * | 4/2003  | Yaginuma et al. | 396/460 |
| 6,763,185 B2 | * | 7/2004  | Noguchi et al.  | 396/6   |

FOREIGN PATENT DOCUMENTS

| JP | 45-13923  | 6/1970  |
| JP | 63-239430 | 10/1988 |

(Continued)

*Primary Examiner*—Ngoc-Yen Vu
*Assistant Examiner*—Kent Wang
(74) *Attorney, Agent, or Firm*—Oblon, Spivak, McClelland, Maier & Neustadt, P.C.

(57) ABSTRACT

In an image pickup apparatus having an openable and closable shutter mechanism to protect an image pickup lens portion of a ultra-small and light-weight video camera, the shutter mechanism is composed of a drive mechanism 34 including an output shaft rotated by a motor 36 through a deceleration mechanism, a cam plate 24 engaged with the output shaft of the drive mechanism 34 to be rotated through a shaft mechanism coaxial with the output shaft, a shutter plate 23 engaged with a cam groove 27 of the cam plate 24 to be slidably lowered and elevated in the longitudinal direction of a video camera body portion to open and close the front surface of the image pickup lens portion and a clutch mechanism provided in the drive mechanism 34 to isolate a drive transmission system of the output shaft and the motor 36 when external force stronger than predetermined external force is applied to the shutter plate 23 which is being opened and closed. In the ultra-small micro MV video camera, the shutter mechanism to protect the image pickup lens portion can be miniaturized, the shutter mechanism can be avoided from being broken and the highly-precise shutter mechanism can be obtained by simple and easy assembly.

5 Claims, 10 Drawing Sheets

FOREIGN PATENT DOCUMENTS

| | | |
|---|---|---|
| JP | 2-251829 | 10/1990 |
| JP | 5-90461 | 12/1993 |
| JP | 5-333404 | 12/1993 |
| JP | 10-319475 | 12/1998 |
| JP | 2000-9154 | 1/2000 |
| JP | 2000-147600 | 5/2000 |
| JP | 2002-6366 | 1/2002 |
| JP | 2003-75900 | 3/2003 |

* cited by examiner

IMAGE PICKUP APPARATUS HAVING A SHUTTER CLUTCH

BACKGROUND OF THE INVENTION

1. Field of the Invention

The present invention generally relates to an ultra-small and light-weight image pickup apparatus such as a so-called micro MV video camera and a digital still camera, and particularly to an image pickup apparatus including a miniaturized shutter mechanism serving as a lens cover to protect an image pickup lens and a clutch mechanism for avoiding a shutter mechanism from being broken and in which a highly-precise shutter mechanism can be obtained by simple and easy assembly.

2. Description of the Related Art

As digital video cameras including an external liquid-crystal display monitor panel openable and closable to the video camera body through a hinge mechanism and digital video cameras with a memory card such as an IC (integrated circuit) recording media that can record or reproduce a recorded image as a moving picture or a still picture become progressively small in size and light in weight recently, video cameras which are more miniaturized and light-weighted, that is, so-called palm-held size digital video cameras are now under development.

On the other hand, in the above-mentioned ultra-small digital video camera, it is requested that its shutter mechanism to protect an image pickup lens should be smaller in space and that such shutter mechanism should be simple in arrangement and high in assembly accuracy. In addition, it is requested that the above ultra-small digital video camera should have a safety mechanism for avoiding a shutter mechanism from being broken when external force is applied to a shutter plate unintentionally or preventing a motor from being applied with an overload during the shutter plate is being opened or closed by a motor drive mechanism.

The cited patent reference 1 has disclosed a small and light-weight lens cover apparatus for opening and closing a lens cover reliably and which can prevent a lens cover drive mechanism from being damaged even when external force is applied to the lens cover.

[Cited Patent Reference 1]

Official gazette of Japanese laid-open patent application No. 2000-261699

The above-mentioned lens cover apparatus comprises a cam portion integrally formed with a rotary dial type operation mode selecting switch for selecting camera operation modes and which has cams with different radiuses required in the shooting mode and the non-shooting mode, a substantially V-like protruded portion slidably in contact with a cam portion with its one member, a lens cover drive arm for engaging one end of the lens cover with the tip end of the other member of the V-like protruded portion, a spring for spring-biasing one member and the other member in the direction in which they become distant from each other and a drive lever composed of a stopper member for restricting the detachment between one member and the other member under spring force of this spring and a resilient member for spring-biasing the protruded portion of one member so that the protruded portion may constantly and slidably contact with the cam portion under spring force to open and close a lens attachment opening by the lens cover moved when the drive lever is moved in unison with the cam portion. The lens cover apparatus having the above-mentioned arrangement is extremely complex in arrangement, and therefore it is not suitable for use with the ultra-small digital video camera. Also, although such lens cover apparatus can easily be assembled into an image pickup apparatus such as a so-called camera which is long in the horizontal direction and which has a wide front surface to mount an image pickup lens, it is not suitable for use with a so-called video camera having a wide side surface portion to mount a holding portion and which has a narrow oblong surface in the longitudinal direction to mount an image pickup lens.

SUMMARY OF THE INVENTION

In view of the aforesaid aspect, it is an object of the present invention to provide an image pickup apparatus in which an image pickup apparatus can be constructed as an ultra-small and light-weight image pickup apparatus.

It is another object of the present invention to provide an ultra-small image pickup apparatus in which a shutter mechanism to protect an image pickup lens portion can be miniaturized more.

It is a further object of the present invention to provide an ultra-small image pickup apparatus in which a shutter mechanism can be avoided from being broken.

It is yet a further object of the present invention to provide an ultra-small image pickup apparatus in which a highly-precise shutter mechanism can be obtained by simple and easy assembly.

According to an aspect of the present invention, there is provided an image pickup apparatus including an image pickup lens portion disposed on a camera body portion and an openable and closable shutter mechanism serving as a lens cover to protect the image pickup lens portion. This image pickup apparatus is comprised of the shutter mechanism comprising a drive mechanism including an output shaft rotated by a motor serving as a drive source through a deceleration mechanism, a cam plate engaged with the output shaft of the drive mechanism and rotated through a shaft mechanism coaxial with the output shaft, a shutter plate engaged with a cam groove of the cam plate and slid up and down vertically relative to the camera body portion to open and close the front surface of the image pickup lens portion and a clutch mechanism provided in the drive mechanism to cut off a drive transmission system of the output shaft and the motor when external force stronger than predetermined external force is applied to the shutter plate which is being opened and closed.

As described above, according to this image pickup apparatus, even when opening or closing operation of the shutter plate which is being opened or closed is hindered by a finger or the like, the drive transmission mechanism of the output shaft and the motor is isolated by the clutch mechanism and the overload can be prevented from being applied to the motor, thereby making it possible to prevent the shutter mechanism and the like from being broken.

According to other aspect of the present invention, there is provided an image pickup apparatus, wherein the clutch mechanism further comprises a gear directly coupled to the motor to rotate and in which the gear and a shaft portion integrally formed with the output shaft are coaxially pivoted to become free, a clutch spring is interposed between the gear and the output shaft and the gear and the clutch spring are engaged with each other with friction.

As described above, according to this image pickup apparatus, since the clutch mechanism includes the gear and the clutch spring which are engaged with each other with friction, the drive transmission system of the output shaft and the motor can be isolated without using a complex mechanism.

According to a further aspect of the present invention, there is provided an image pickup apparatus, wherein the shaft mechanism has an arrangement in which a shaft aperture formed on one surface of the cam plate is pivotally engaged with a fulcrum shaft of the camera body side and a flange-like shaft portion formed at tip end portion of the output shaft is pivotally engaged with a protrusive expanding slot formed on the other surface of the cam plate.

As described above, according to this image pickup apparatus, the fulcrum shaft of the camera body side, the shaft aperture of the cam plate and the flange-like shaft portion of the output shaft can be aligned with ease by a simple arrangement.

According to yet a further aspect of the present invention, there is an image pickup apparatus, wherein the image pickup apparatus issues a warning to users in the form of character display or sounds when the shutter plate is applied with external force so that the shutter plate is kept being opened.

As described above, according to this image pickup apparatus, it is possible for users to recognize, in the form of displayed message or sounds, that the shutter plate is not closed with application of external force.

According to still a further aspect of the present invention, there is provided an image pickup apparatus, wherein the camera body portion has an outer housing of substantially rectangular-solid shape, the outer housing an opening hole formed on an upper portion of one narrow side surface of a width direction, the image pickup lens portion is disposed in the inside of the opening hole and the opening hole is opened and closed by slidably moving the front surface of the image pickup lens portion up and down in the longitudinal direction in the inner surface of the outer housing by the one shutter plate.

As described above, according to this image pickup apparatus, it becomes possible to mount the shutter open and close mechanism in the image pickup apparatus such as, in particular, the video camera in which the surface with the image pickup lens portion attached is oblong and narrow in width. Thus, it becomes possible for the user to operate the ultra-small image pickup apparatus according to the present invention comfortably.

As described above, in accordance with still a further aspect of the present invention, there is provided an image pickup apparatus, wherein the cam plate and the drive mechanism for driving the shutter plate are longitudinally disposed substantially in the width of the shutter plate under said opening hole.

Further, as described above, according to the present invention, since the clutch mechanism is disposed in such limited size portion, that is, at the portion of the rotary central shaft of the cam plate to which strongest external force is applied, if the rotation of the shutter plate is hindered by the user's finger or the shutter plate is forcibly opened, then the image pickup apparatus can be used without breaking the drive mechanism.

DESCRIPTION OF THE PREFERRED EMBODIMENTS

An image pickup apparatus according to an embodiment of the present invention will hereinafter be described with reference to the drawings, in which case an ultra-small image pickup apparatus, for example, a micro MV video camera is taken as an example.

Figure 1:
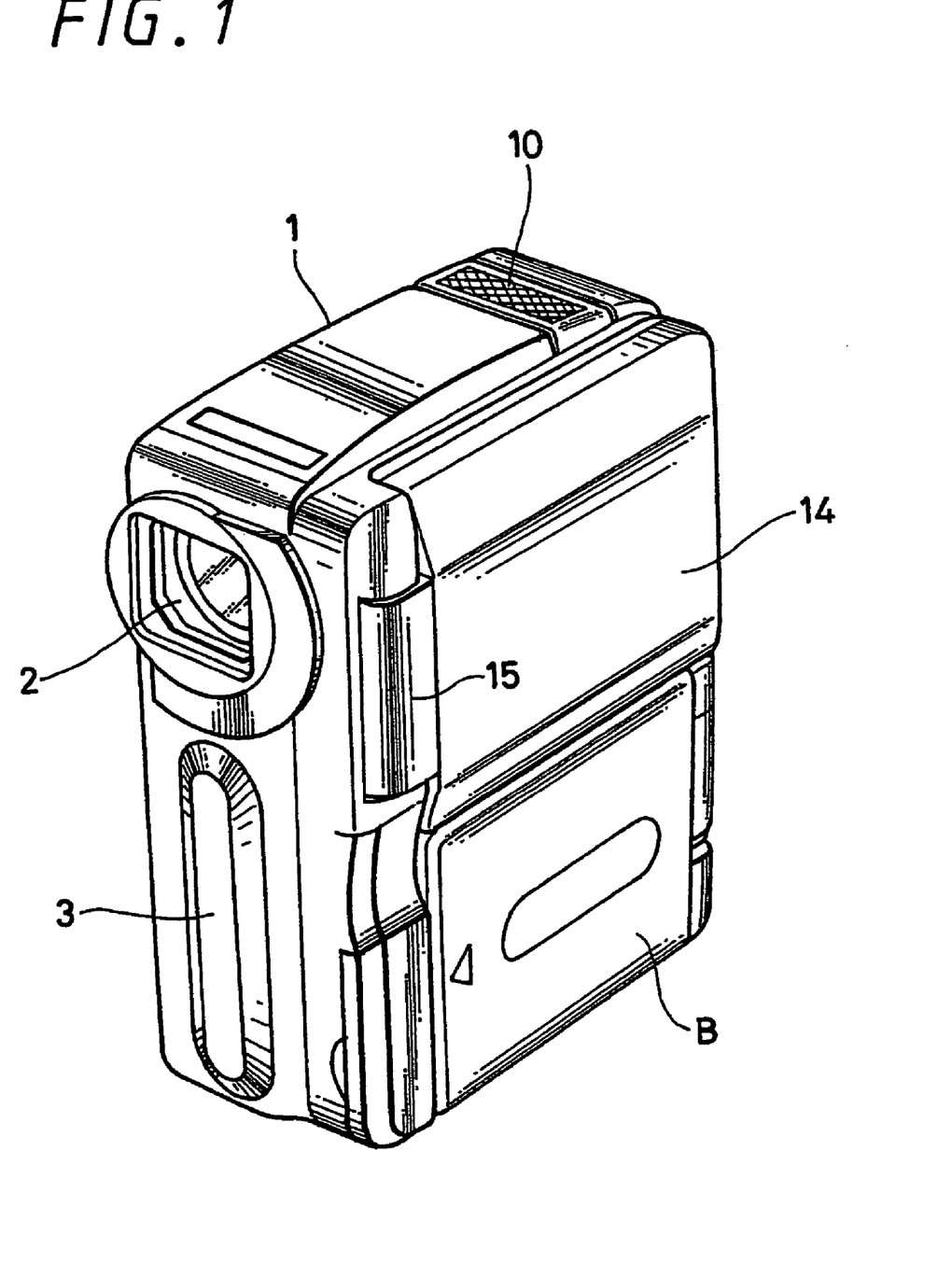
FIG. 1 is a perspective view showing an external appearance of the whole of a micro MV video camera according to an embodiment of the present invention.
Figure 2:
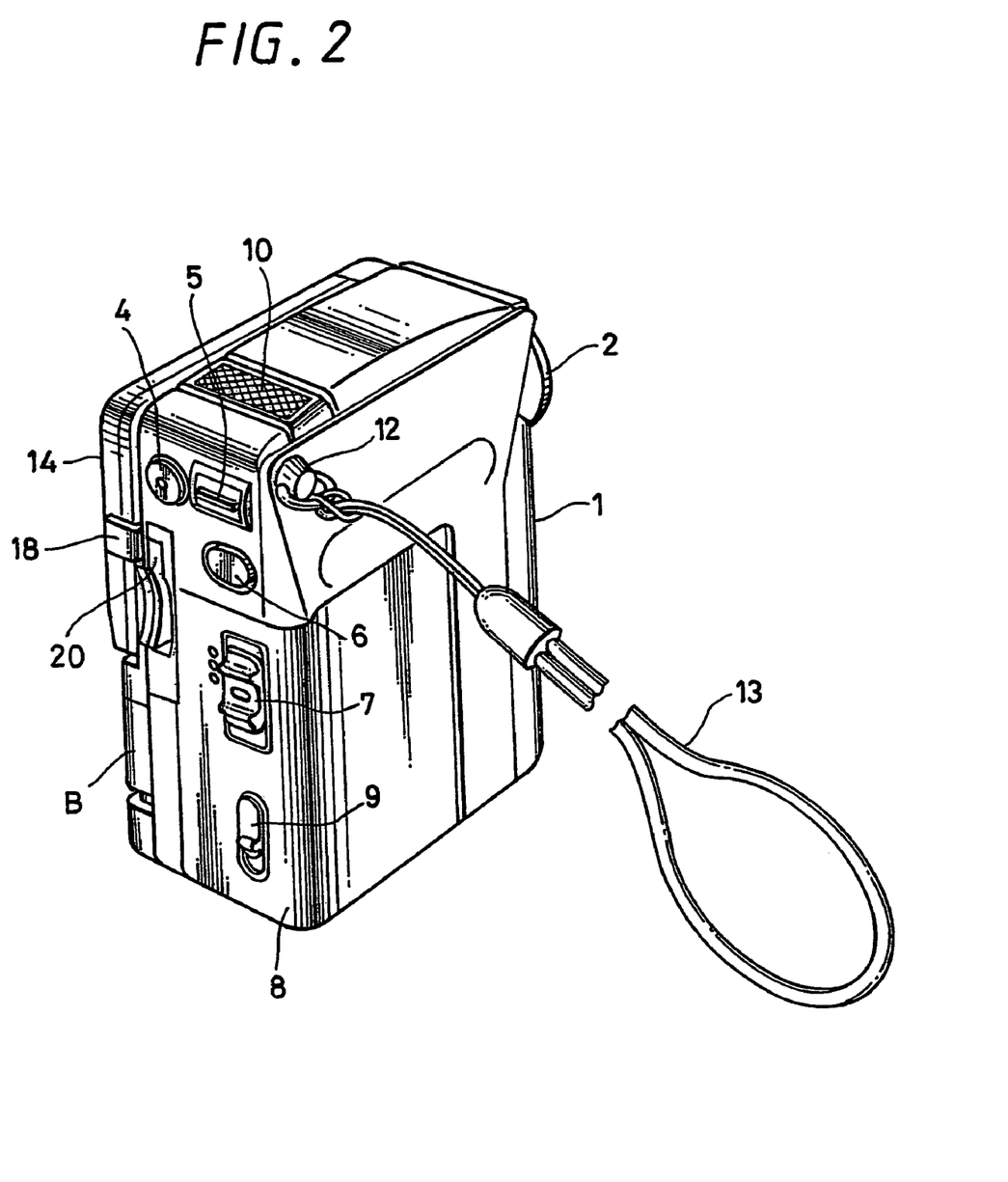
FIG. 2 is a perspective view showing an external appearance of the whole of the micro MV video camera from the side of its strap.
Figure 3:
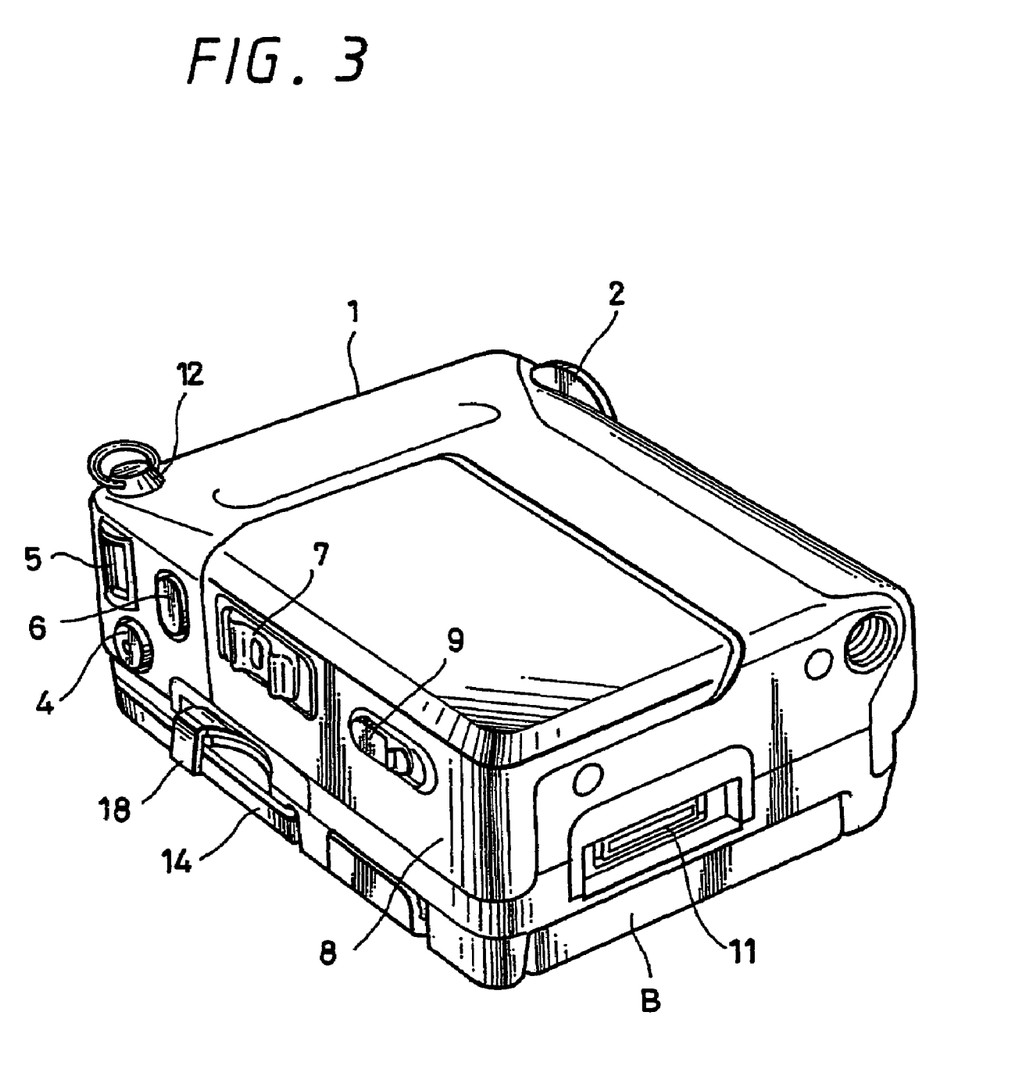
FIG. 3 is a perspective view showing an external appearance of the whole of the micro MV video camera from the bottom surface side.
Figure 4:
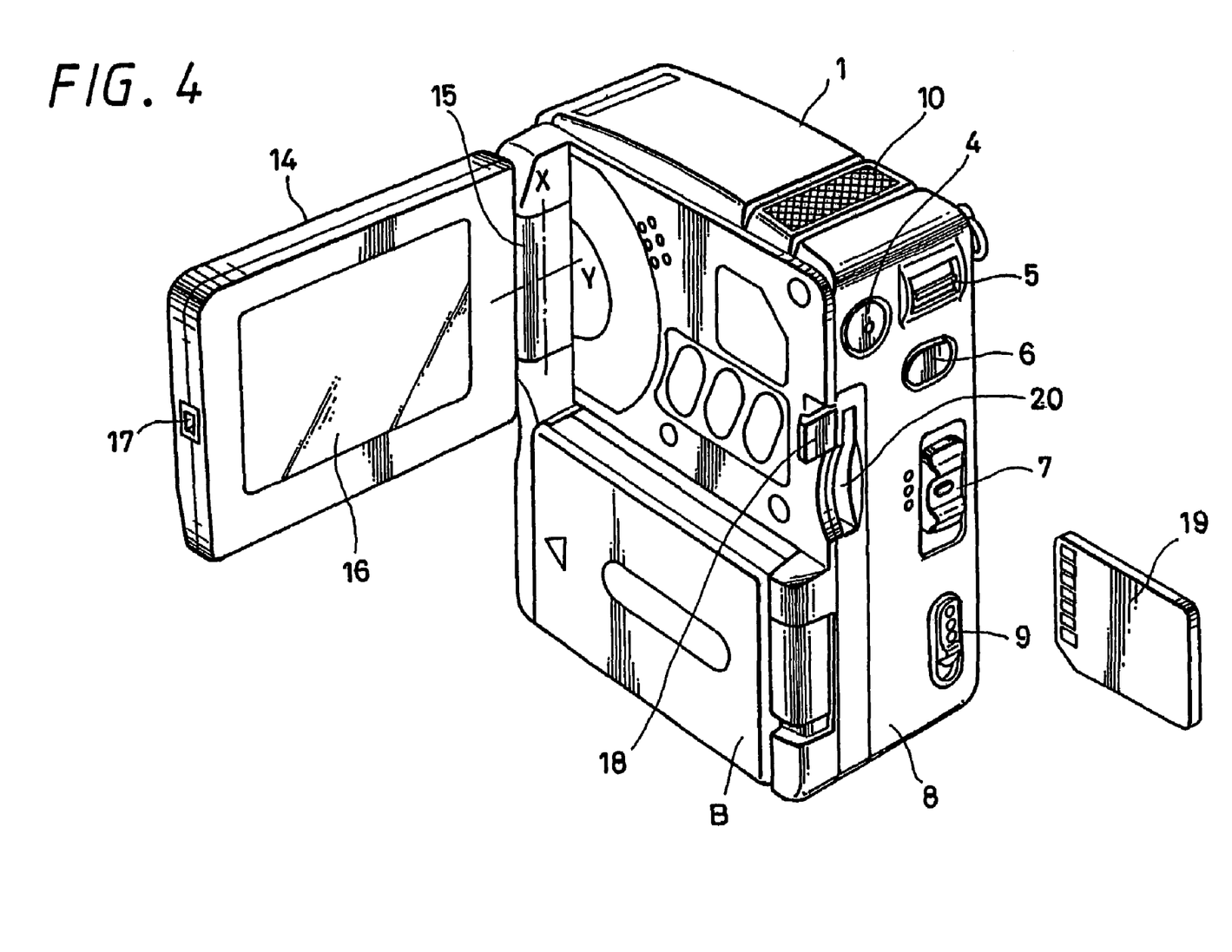
FIG. 4 is a perspective view showing an external appearance of the whole of the micro MV video camera with its liquid-crystal display panel being opened and its memory card.

FIG. 1 is a perspective view showing an external appearance of the whole of a micro MV video camera from the side of the image pickup lens portion in the state in which a monitor display panel of the micro MV video camera is accommodated into a video camera body (hereinafter referred to as a "video camera body"); FIG. 2 is a perspective view, showing an external appearance of the whole of the micro MV video camera from the rear surface side in the state in which the monitor display panel is similarly accommodated into the video camera body; FIG. 3 is a perspective view showing an external appearance of the whole of the micro MV video camera from the bottom surface side in the state in which the monitor display panel is similarly accommodated into the video camera body; and FIG. 4 is a perspective view showing an external appearance of the whole of the micro MV video camera from the rear surface side of the video camera body in the ordinary shooting state in which the monitor display panel is opened.

As illustrated in the above-mentioned sheets of the drawings, the whole of the video camera body 1 is oblong and rectangular in shape and its thickness is decreased in the width direction. Also, the video camera body 1 is of the ultra-small size so that it can be held in the user's palm. Also, the panel material comprising the outer housing of the video camera body 1 is molded by a suitable material such as a magnesium alloy material, an aluminum material and an ABS (acrylonitrile-butadiene-styrene) resin and hence the panel material of the video camera body 1 can be finished as a thin panel material. As a result, the video camera body 1 can be made light in weight and miniaturized in size. In particular, since the panel material is molded by the magnesium alloy material, the outer housing of the video camera body 1 can be made light in weight and strong in rigidity.

An overall arrangement of the video camera body 1 will be described first. As illustrated, an image pickup lens portion 2 is provided on the upper portion of the front surface of the video camera body 1, and the front surface of the image pickup lens portion 2 can be opened and closed by a shutter mechanism including a shutter plate serving as a lens cover, which will be described later on, to protect the image pickup lens portion 2. The lower portion of the image pickup lens portion 2 serves as a grip portion 3 by which the user can hold the video camera body 1 with hand. On the upper portion of the rear surface of the video camera body 1, there are provided a recording start/stop button 4 and a zoom lever 5 adjacent to this recording/stop button 4. A photo button 6 for taking a still picture is disposed beneath this zoom lever 5. Under this photo button 6, there is provided a slide lever 7 for turning on/off the power switch and the charge of a battery and which is also used to switch the camera mode/memory card to record video and audio information on a tape cassette serving as a recording medium.

Further, beneath the slide lever 7, there is disposed a cassette eject lever 9 for opening and closing a cassette lid 8. When the cassette lid 8 is opened, the tape cassette can be loaded on/ejected from a tape loading mechanism, not shown. In the above respective sheets of drawings, reference numeral 10 denotes a directional microphone disposed on the upper surface of the video camera body 1 to collect sounds.

As shown in FIG. 3, the video camera body 1 has a connector terminal portion 11 provided on its bottom surface. When the video camera body 1 is electrically mounted on a rotatable holder portion of a cradle, not shown, and the video camera is powered in the state in which the image pickup lens portion 2 is faced to the front direction, this connector terminal portion 11 allows the video camera body 1 to be placed in the image shooting mode. Also, when the video camera is powered in the state in which a liquid-crystal panel, which will be described later on, is faced to the front direction, this connector terminal portion 11 allows the video camera body 1 to be placed in the playback mode.

As shown in FIG. 2, a strap attachment metal fitting 12 is attached to the upper portion of the other side surface of the video camera body 1, and a strap 13 is attached to this strap attachment metal fitting 12.

As shown in FIG. 4, a liquid-crystal display panel 14 serving as a monitor display panel is disposed in the upper portion of the left side surface of the video camera body 1. The liquid-crystal display panel 14 is externally attached to the video camera body 1 by a biaxial hinge mechanism 15 which can be rotated in the X-axis direction and the Y-axis direction.

The outer housing of the liquid-crystal display panel 14 is molded from the light-weight and rigid magnesium alloy material similarly to the video camera body 1. The liquid-crystal display panel 14 has a liquid-crystal display screen 16 provided on the rear surface side thereof. When the liquid-crystal display panel 14 is opened 90° about the X axis as shown in FIG. 4, the video camera body 1 is placed in the ordinary image shooting mode state and the user becomes able to take a picture while watching a monitor picture displayed on the liquid-crystal display screen 16. Although not shown, the liquid-crystal display panel 14 can be rotated about the Y axis in the direction of the angle of elevation and the user is able to take a picture while adjusting the liquid-crystal display screen 16 at an angle by which the user becomes easy to watch the liquid-crystal display screen 16.

Further, the liquid-crystal display panel 14 can be inverted 180° about the Y axis from the state shown in FIG. 4 and the liquid-crystal display screen 16 can be faced to the side of the image pickup lens portion 2, that is, it can be faced to the direction of the object. As a result, the user can take users' own picture and the person who becomes the object can watch a picture displayed on the liquid-crystal display screen 16. A battery B formed of a detachable secondary battery is attached to the portion of the video camera body 1 under the liquid-crystal display panel 14.

FIGS. 1 and 2 show the state in which the liquid-crystal display panel 14 is closed to the side of the video camera body 1 and stored therein. At that time, in the liquid-crystal display panel 14, a recess portion 17 provided on the outer end portion of the liquid-crystal display panel 14 is locked by a hook member 18 which is biased under spring force of a spring, not shown, on the side of the video camera body 1.

A card insertion slot 20 of a memory card 19 is formed on the video camera body 1 at its rear surface position parallel to and adjacent to the outer end portion of the liquid-crystal display panel 14. As shown in FIG. 4, a memory card 19 that is inserted from the card insertion slot 20 is a suitable recording media such as an IC (integrated circuit) recording media for recording a moving picture and a still picture. The memory card 19 is of the so-called push-push type memory card so that the memory card 19 inserted from the card insertion slot 20 is stored in a memory card holder, not shown, when pushed and that the rear end portion of the memory card 19 may be ejected from the memory card holder when pushed again.

Figure 5:
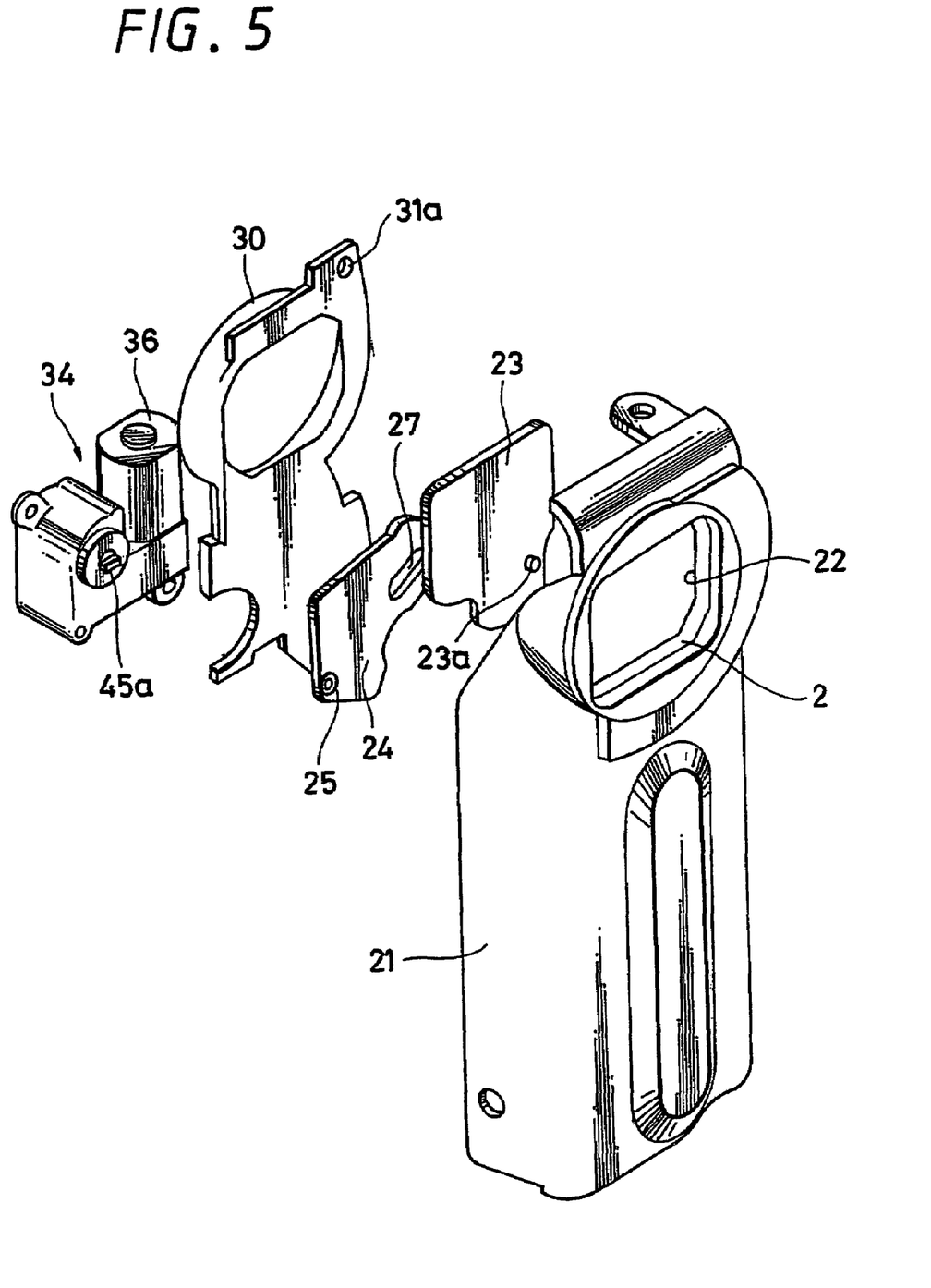
FIG. 5 is an exploded perspective view showing a shutter mechanism from the front surface side of a video camera body.
Figure 6:
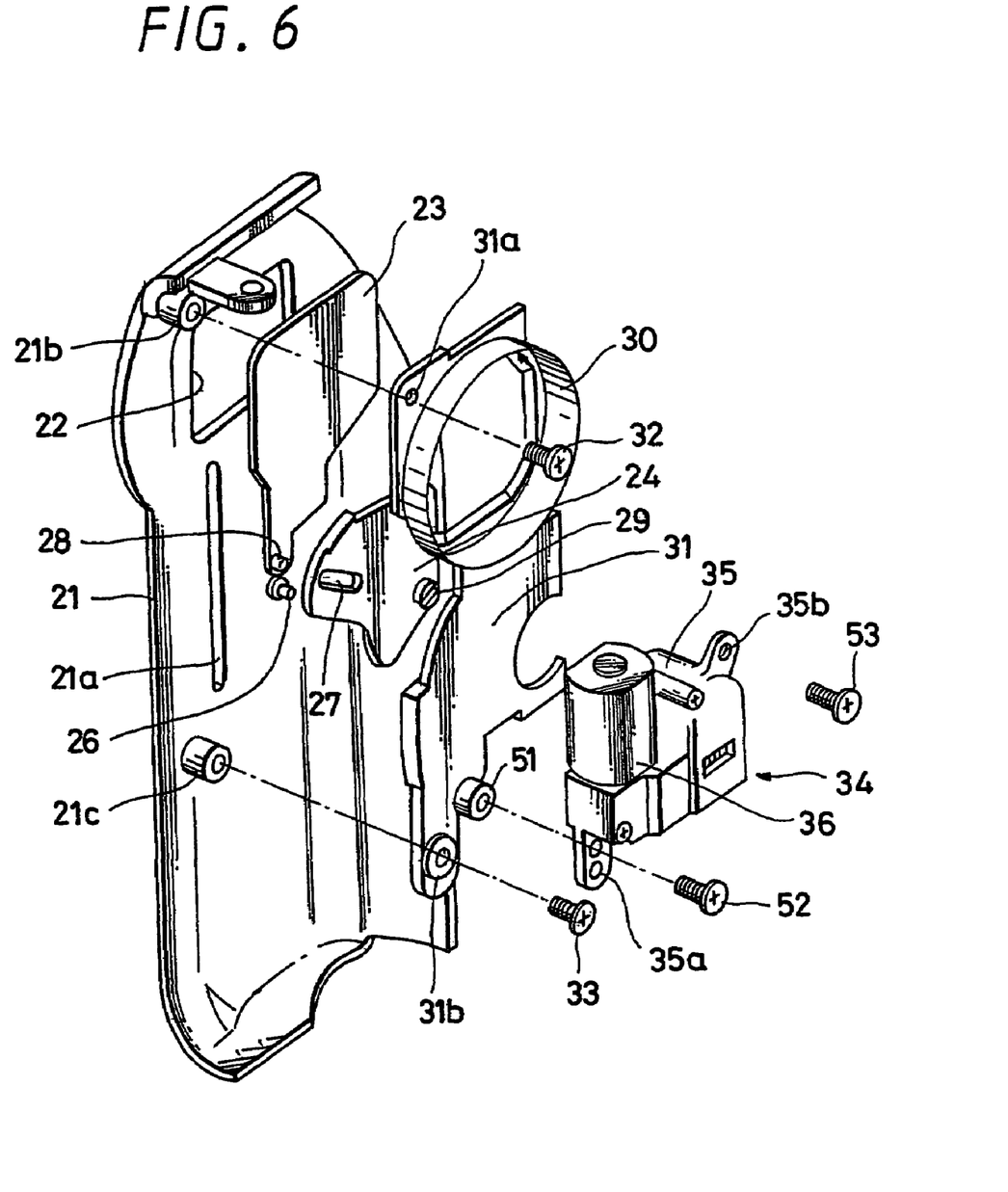
FIG. 6 is an exploded perspective view showing the shutter mechanism from the rear surface side of the video camera body.
Figure 7:
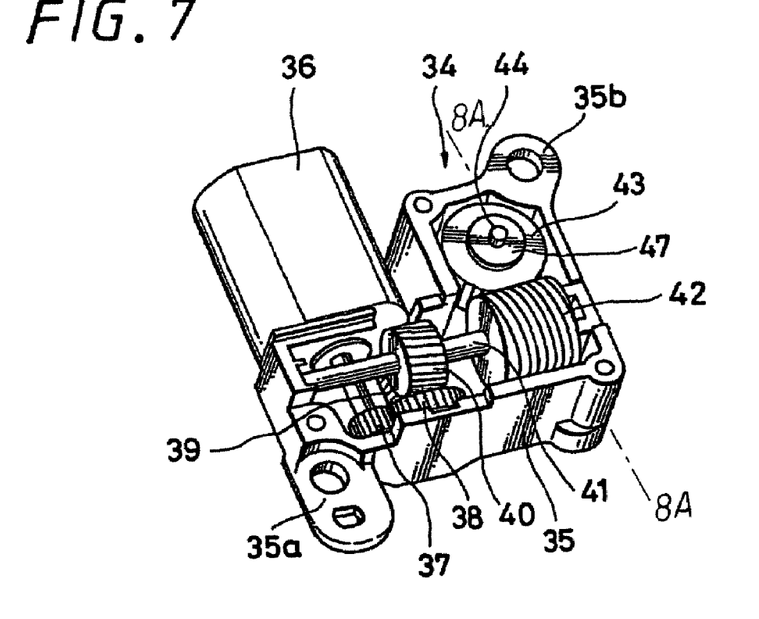
FIG. 7 is a perspective view showing the assembled state of a drive mechanism including a motor to drive the shutter mechanism and a clutch mechanism.
Figure 8:
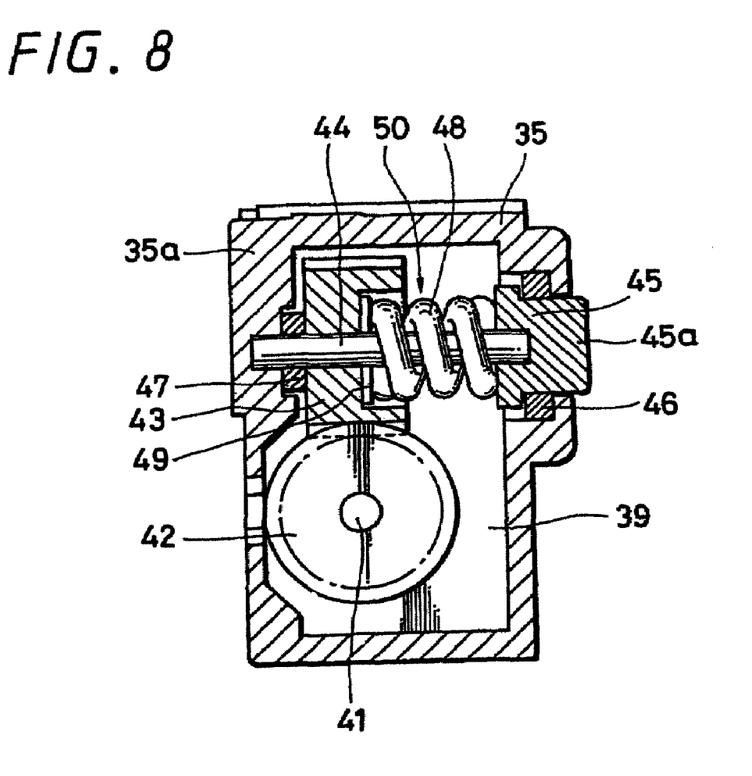
FIG. 8 is a cross-sectional view taken along the line 8A-8A in FIG. 7 and illustrates the clutch mechanism.
Figure 9A:
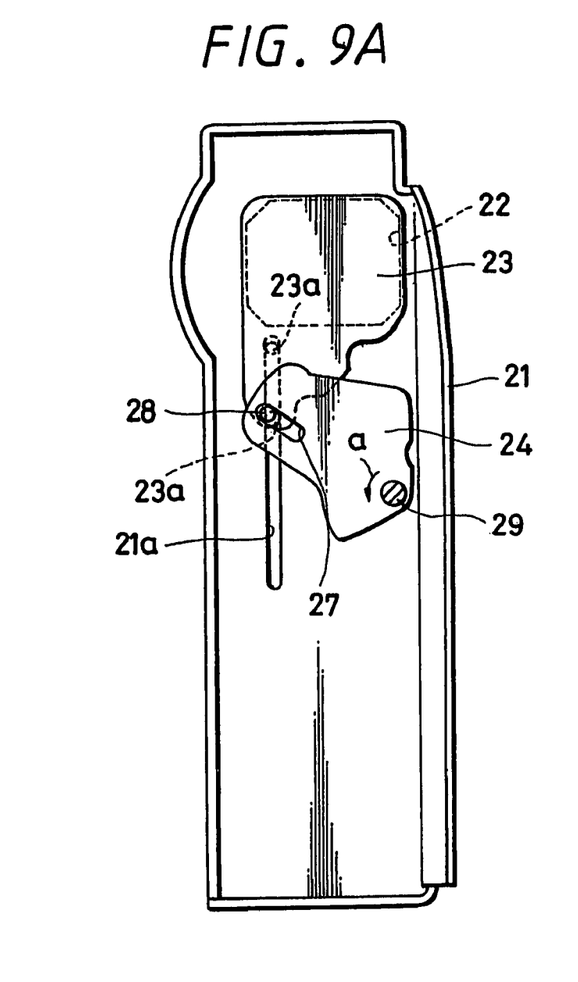
FIG. 9A is a schematic diagram showing the state in which a shutter plate is closed from the rear surface side of the video camera body.
Figure 9B:
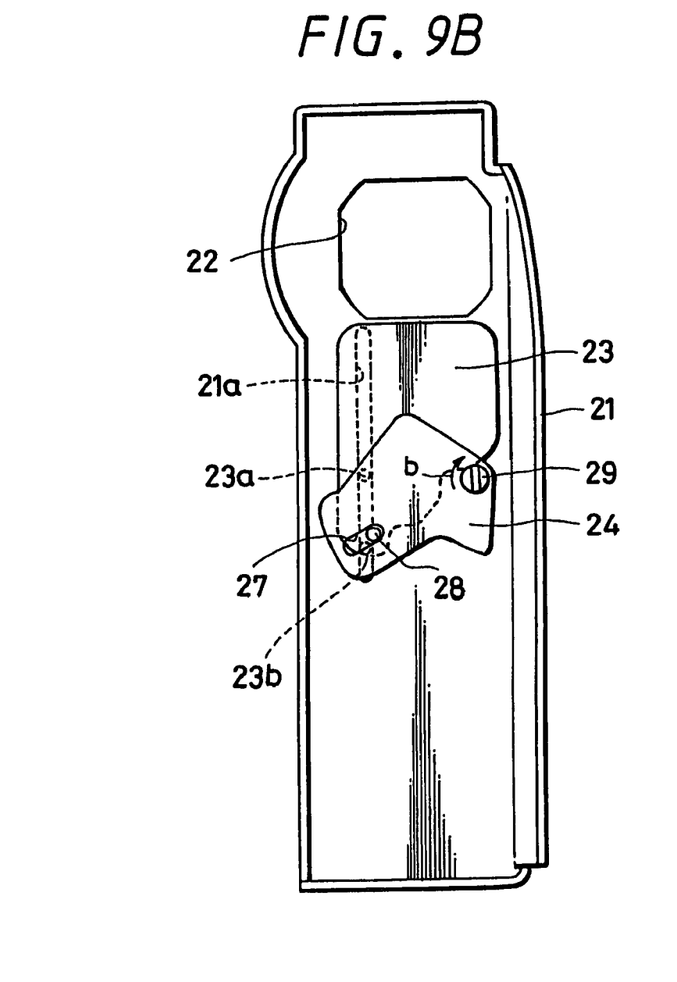
FIG. 9B is a schematic diagram showing the state in which the shutter plate is opened from the rear surface side of the video camera body.

A shutter mechanism which is the main portion of the present invention will be described below with reference to FIGS. 5 to 10. FIG. 5 is an exploded perspective view showing a shutter mechanism from the front surface side of the video camera body 1; FIG. 6 is an exploded perspective view showing the same shutter mechanism from the rear surface side of the video camera body 1; FIG. 7 is a perspective view showing the assembled state of a drive mechanism including a motor to drive the shutter mechanism and a clutch mechanism which is the main portion of the present invention; FIG. 8 is a cross-sectional view taken along the line 8A-8A in FIG. 7 and shows the clutch mechanism; FIG. 9A is an operation diagram showing the state in which the shutter plate is closed from the rear surface side of the video camera body 1; and FIG. 9B is an operation diagram showing the state in which the shutter plate is opened from the rear surface side of the video camera body 1.

In the above respective sheets of the drawings, reference numeral 21 denotes a front surface panel comprising the front housing of the video camera body 1. The front surface panel 21 is molded from a suitable material, which is light in weight and strong in rigidity, such as a magnesium alloy material. As illustrated, a window hole 22 for use with the image pickup lens portion 2 is opened in the upper portion of the front surface panel 21. A shutter plate 23 serving as the lens cover is moved up and down on the rear surface side of this window hole 22 to thereby make it possible to open and close the window hole 22.

A guide pin 23a protruded from the front surface of the shutter plate 23 is engaged with a longitudinally oblong guide groove 21a formed on the rear surface of the front surface panel 21 and thereby the shutter plate 23 can be moved in the upper and lower direction. A fulcrum shaft aperture 25 formed on one end side of the front surface of a cam plate 24 is engaged with a fulcrum shaft 26 provided on the rear surface of the front surface panel 21 and thereby the cam plate 24 can be rotated. The cam plate 24 is assembled to the shutter plate 23 in such a manner that a cam pin 28 provided on the end portion of the shutter plate 23 may be engaged with a cam groove 27 formed on the other end side distant from the fulcrum shaft aperture 25 of the cam plate 24. In addition, an expanding slot 29 is formed on the rear surface side of the cam plate 24 in such a manner that it may protrude to become coaxial with the fulcrum shaft aperture 25. An output shaft of the drive mechanism having the motor, which will be described later on, engages with this expanding slot 29 to thereby rotate the cam plate 24.

Then, the above-mentioned shutter plate 23 and cam plate 24 are urged against the front surface panel 21 by a presser plate 31 having a lens holder 30 to hold an image pickup lens (not shown). The presser plate 31 is fixed to fixing portions 21b, 21c of the front surface panel 21 through attachment portions 31a, 31b by screws 32, 33.

In the respective sheets of the drawings, reference numeral 34 denotes a drive mechanism of the shutter plate 23. FIG. 7 is a perspective view showing the inside structure of such drive mechanism 34, and FIG. 8 is a cross-sectional view taken along the line 8A-8A in FIG. 7 and shows the main portion of the drive mechanism 34.

As illustrated, a first gear 38 is meshed with an output gear 37 of a motor 36, serving as a drive source, which is externally attached to a casing 35 of the drive mechanism 34. A second gear 40 is meshed with the first gear 38 through a first worm gear 39 which is coaxial with the first gear 38. The second gear 40 is coaxial with a second worm gear 42 and a shaft 41. A hird gear 43 is meshed with the second worm gear 42, thereby resulting in a deceleration mechanism being constructed.

Then, the third gear 43 is pivotally supported to a drive shaft 44 so as to become freely rotatable. An output shaft 45 is integrally inserted into one end portion of the drive shaft 44 with pressure, and the output shaft 45 is rotably mounted on the casing 35 through a ring 46. A tip end portion of the output shaft 45 is shaped as a flange-like shaft portion 45a which is protruded to the outside of the casing 35. Also, the other portion of the drive shaft 44 is rotably mounted on a lid portion 35a of the casing 35 through a stopper 47. Then, a clutch spring 48 is disposed surrounding the drive shaft 44 between the third gear 43 and the output shaft 45.

While one end portion of this clutch spring 48 is urged against the output shaft 45 with large frictional force, the other end portion of the clutch spring 48 is joined to the third gear 43 with frictional force through a friction plate 49. Thus, the third gear 43 and the output shaft 45 constitute a clutch mechanism 50.

Figure 10:
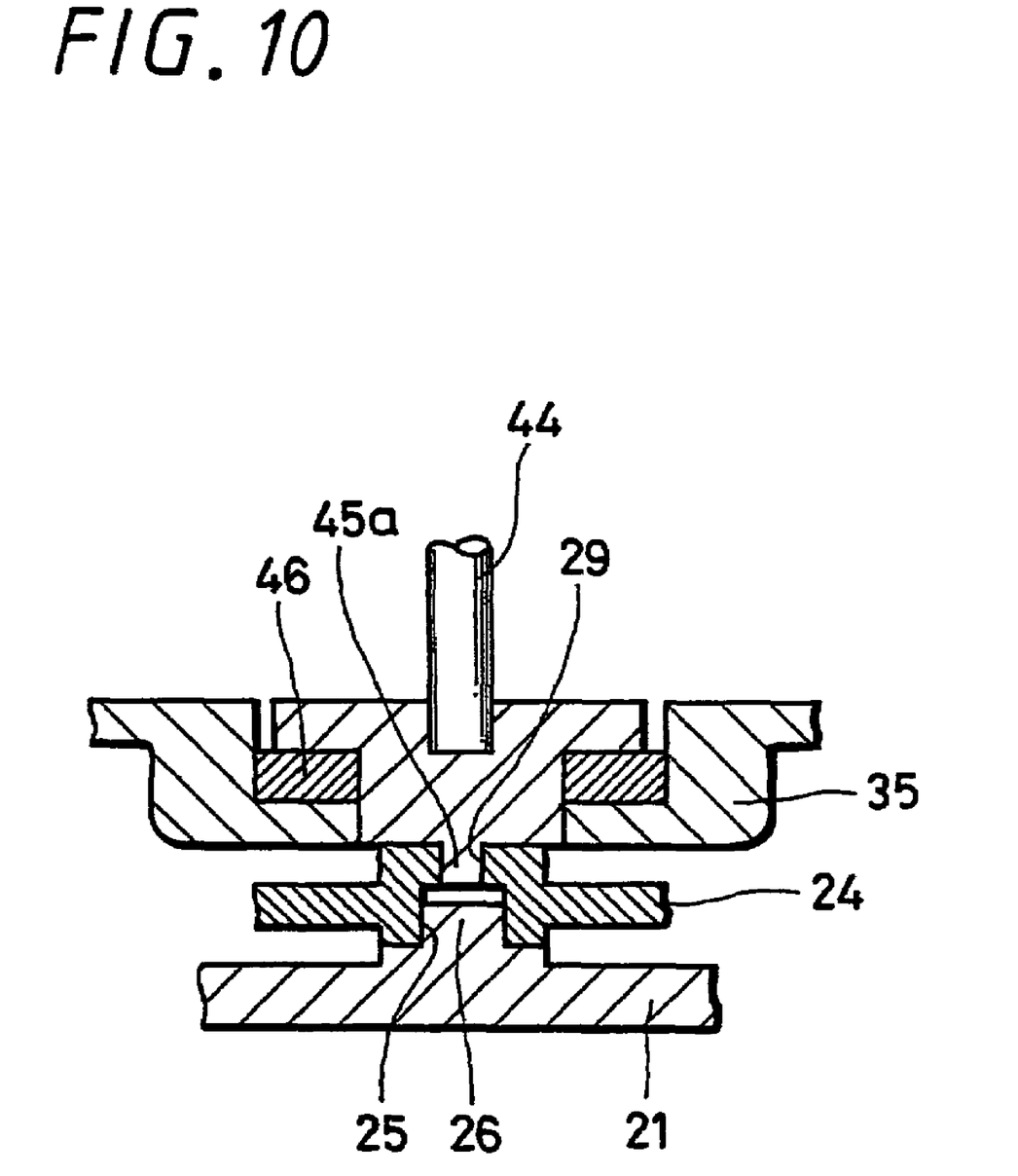
FIG. 10 is a cross-sectional view showing the state in which a fulcrum shaft of a front panel, a fulcrum shaft of a cam plate and a flange-like shaft of an output shaft are aligned.

In the drive mechanism 34 having the above-mentioned arrangement, the flange-like shaft portion 45a of the output shaft 45 is aligned with and engaged with the expanding slot 29 of the above-mentioned cam plate 24 and the cam plate 24 is rotated by the output shaft 45. As a result, the fulcrum shaft aperture 25 of one surface side of the cam plate 24 which engages with the fulcrum shaft 26 of the front surface panel 21 and the flange-like shaft portion 45a of the output shaft 45 of the drive mechanism 34 which engages with the expanding slot 29 of the other side surface of this cam plate 24 are aligned on the same axis as shown in FIG. 10.

When the fulcrum shaft aperture 25 and the flange-like shaft portion 45a are aligned on the same axis as described above, the fulcrum shaft 26 of the front surface panel 21, the fulcrum shaft aperture 25 of the cam plate 24 and the flange-like shaft portion 45a of the output shaft 45 can be aligned by a simple arrangement.

Also, in the drive mechanism 34, one attachment portion 31a of its casing 35 is fixed to a fixing portion 51 of the presser plate 31 by a screw 52 and another attachment portion 31b of the casing 35 is fixed to a fixing portion (not shown) of the front surface panel 21 by a screw 53.

Operations to open the shutter plate 23 (hereinafter simply referred to as an "opening") and to close the shutter plate 23 (hereinafter simply referred to as a "closing") will be described next. The shutter plate 23 includes an opening switch for detecting that the shutter plate 23 is opened and a closing switch for detecting that the shutter plate 23 is closed, although not shown.

FIG. 9A shows the state in which the shutter plate 23 closes the window hole 22 of the front surface panel 21 to protect the image pickup lens portion 2, that is, the non-shooting state of the video camera. In this non-shooting state, the power switch of the video camera is placed in the off-state.

When the power switch of the video camera is turned on, the shutter plate 23 is moved from the closed state to the opened state. More specifically, the motor 36 is driven to rotate the third gear 43 through the deceleration mechanism. In the ordinary opening operation to open the shutter plate 23 without application of external force from the finger and the like while shutter plate 23 is being opened, the third gear 43 is rotated in unison with the clutch spring 48 and the output shaft 45 through a friction plate 49. As the output shaft 45 is rotated, the expanding slot 29, which is the fulcrum shaft of the cam plate 24 engaged with the flange-like shaft portion 45a of the tip end portion of the output shaft 45, is rotated in the direction shown by an arrow a in FIG. 9A, whereby the cam plate 24 is rotated in the counter-clockwise direction. When the cam plate 24 is rotated, the shutter plate 23 is lowered along the guide groove 21a and opened through the cam pin 28 engaged with the cam groove 27 as shown in FIG. 9B. Then, the opening switch (not shown) detects that the shutter plate 23 is opened and the video camera is placed in the shooting mode.

Also, the power switch of the video camera is turned off, whereby the shutter plate 23 is moved from the opening operation to the closing operation. In the closing operation of the shutter plate 23, the motor 36 is rotated in the reverse direction and the expanding slot 29, which is the fulcrum shaft of the cam plate 24, is rotated in the direction shown by an arrow b in FIG. 9B, whereby the cam plate 24 is rotated in the clockwise direction. When the cam plate 24 is rotated in the clockwise direction, the shutter plate 23 is elevated along the guide groove 21a through the cam pin 28 engaged with the cam groove 27 and thereby closed. The opening switch (not shown) detects that the shutter plate 23 is closed, and the video camera is placed in the non-shooting mode.

At that time, even in the state in which the opening operation of the shutter plate 23 is mechanically completed and the opening switch detects that the shutter plate 23 is opened or even in the state in which the closing operation of the shutter plate 23 is mechanically completed and the closing switch detects that the shutter plate 23 is closed, the motor 36 is continued to be driven during a predetermined time and then the motor 36 is stopped. The reason for this is that the shutter plate 23 may be placed in the over-stroke state in order to enable the shutter plate 23 to be opened and closed reliably even when an obstruction occurs in the deceleration mechanism and the clutch mechanism comprising the drive mechanism or even when an obstruction occurs in the assembly of the cam plate 24 and the shutter plate 23.

For example, in the state in which the shutter plate 23 is moved from the opening state to the closing state after the power switch of the video camera was turned off, when the user puts the finger between the shutter plate 23 and the window hole 22 to hinder the movement of the shutter plate 23, it is unavoidable that the drive mechanism and the deceleration mechanism including the motor 36, the cam plate 24 and the shutter plate 23 will be broken. According to the present invention, when the movement of the shutter plate 23 is hindered, the clutch mechanism 50 starts to operate. More specifically, when the movement of the shutter plate 23 is hindered, the output shaft 45 of the drive mechanism 34 is stopped but the drive force from the motor 36 is transmitted through the deceleration mechanism to the third gear 43 to rotate the third gear 43. However, in this case, the third gear 43 and the friction plate 49 act with each other with friction so that the drive force from the motor 36 can be prevented from being transmitted to the output shaft 45, thereby preventing the drive mechanism and the deceleration mechanism including the motor 36, the cam plate 24 and the shutter plate 23 from being broken.

Operations of the shutter plate 23 closed when the power switch of the video camera is turned off after the above-mentioned shutter plate 23 was opened will be described with reference to a flowchart of FIG. 11.

Figure 11:
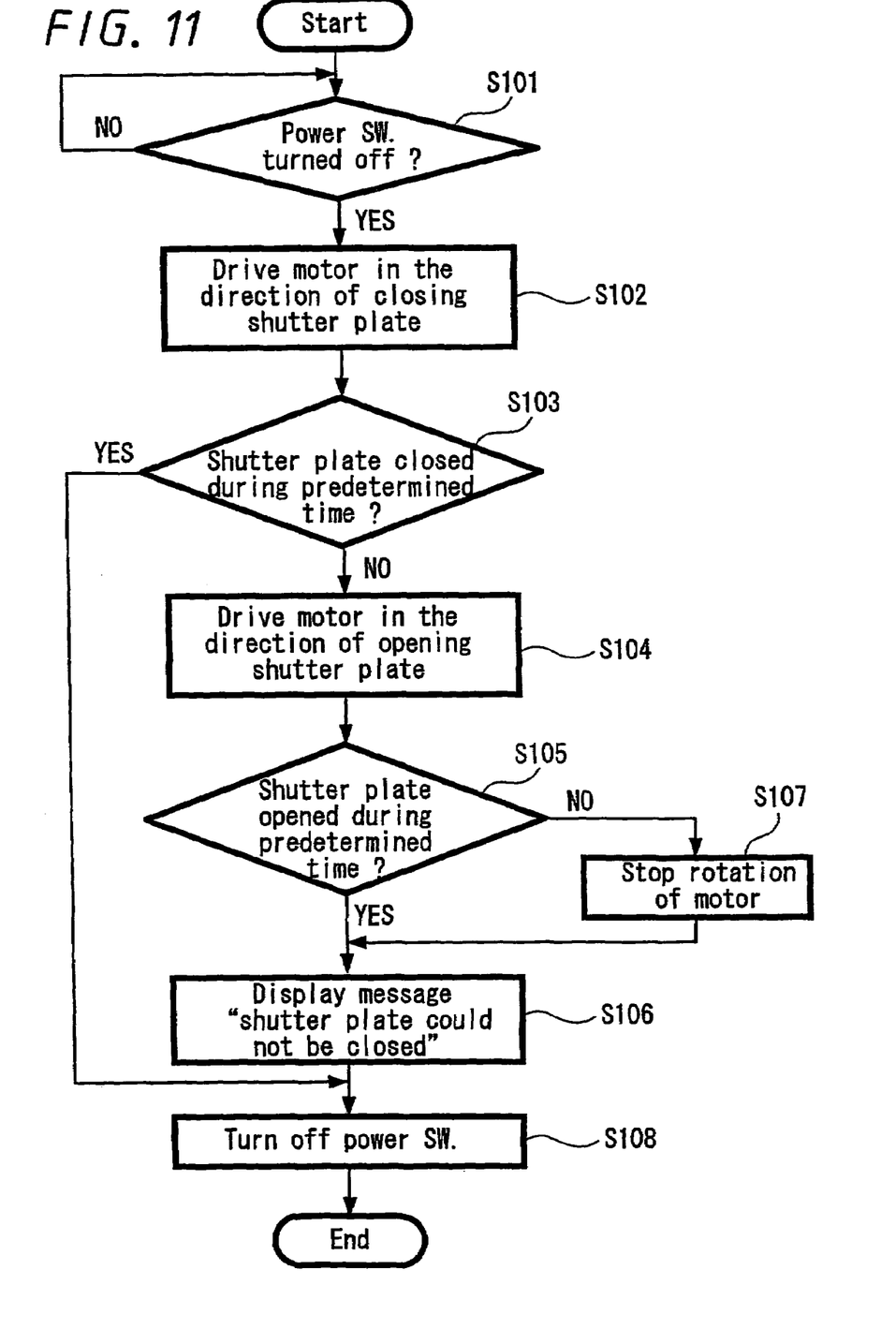
FIG. 11 is a flowchart to which reference will be made in explaining the manner in which the shutter plate is closed after it has been opened when a power switch of a video camera is turned off.

Referring to FIG. 11, and following the start of operation, control goes to a decision step S101, whereat it is determined whether or not the power switch of the video camera is turned off. If the power switch of the video camera is turned off as represented by a YES at the decision step S101, then control goes to a step S102. At the step S102, the motor 36 is driven in the direction in which the shutter plate 23 is closed. If the power switch of the video camera is not turned off as represented by a NO at the decision step S101, then control goes to the decision step S101, and the decision step S101 is repeated until the power switch of the video camera is turned off. Then, control goes to the next decision step S103, whereat it is determined whether or not the shutter plate 23 is closed during a predetermined time. If the shutter plate 23 is closed during the predetermined time as represented by a YES at the decision step S103, then control goes to a step S108, whereat the power switch of the video camera is turned off.

If on the other hand the user hinders the shutter plate 23 from closing with a finger and the like so that the shutter plate 23 cannot be closed during the predetermined time as represented by a NO at the decision step S103, then control goes to a step S104, whereat the motor 36 is driven in the direction in which the shutter plate 23 is opened. Then, control goes to the next decision step S105, whereat it is determined whether or not the shutter plate 23 is opened during a predetermined time. If the shutter plate 23 is opened during a predetermined time as represented by a YES at the decision step S105, then control goes to a step S106. At the step S106, the video camera issues an alarm of a message "SHUTTER COULD NOT BE CLOSED" in the form of displayed message or sounds. Then, control goes to the step S108, whereat the power switch of the video camera is turned off.

If on the other hand the shutter plate 23 is not closed during the predetermined time as represented by a NO at the decision step S105, then control goes to the step S107. At the step S107, after the rotation of the motor 36 was stopped, control goes to the step S106. At the step S106, the video camera issues an alarm of a message "SHUTTER COULD NOT BE CLOSED" in the form of displayed message or sounds. Then, control goes to the step S108, whereat the power switch of the video camera is turned off. Then, control is ended.

In this manner, when external force is applied to the shutter plate 23 and the shutter plate 23 is not closed, the state in which the shutter plate 23 is not closed is issued in the form of the displayed message or by warning sounds, the user becomes able to recognize that the shutter plate 23 is still opened.

As described above, according to the present invention, since the shutter plate 23, the cam plate 24 and the drive mechanism 34 can be longitudinally disposed in substantially the width of the shutter plate 23, it becomes possible to mount the shutter open and close mechanism in the image pickup apparatus such as, in particular, the video camera in which the surface with the image pickup lens portion 2 attached is oblong and narrow in width. Thus, it becomes possible for the user to operate the ultra-small image pickup apparatus according to the present invention comfortably. Further, since the clutch mechanism 50 is disposed in such limited size portion, that is, at the portion of the rotary central shaft of the cam plate 24 to which strongest external force is applied, if the rotation of the shutter plate 23 is hindered by the user's finger or the shutter plate 23 is forcibly opened, then the image pickup apparatus can be used without breaking the drive mechanism 34 or the like.

While the image pickup apparatus has been described so far with reference to the case in which the recording and reproducing medium of the micro MV video camera is the tape cassette, the present invention is not limited thereto, and the recording and reproducing medium may be a disc.

Furthermore, while the micro MV video camera has been described as an example of the image pickup apparatus, the present invention is not limited thereto and can be widely applied to a shutter mechanism of a digital still camera and the like.

As described above, there is provided an image pickup apparatus including an image pickup lens portion disposed on a camera body portion and an openable and closable shutter mechanism serving as a lens cover to protect the image pickup lens portion. This image pickup apparatus is comprised of the shutter mechanism comprising a drive mechanism including an output shaft rotated by a motor serving as a drive source through a deceleration mechanism, a cam plate engaged with the output shaft of the drive mechanism and rotated through a shaft mechanism coaxial with the output shaft, a shutter plate engaged with a cam groove of the cam plate and slid up and down vertically relative to the camera body portion to open and close the front surface of the image pickup lens portion and a clutch mechanism provided in the drive mechanism to cut off a drive transmission system of the output shaft and the motor when external force stronger than predetermined external force is applied to the shutter plate which is being opened and closed.

As described above, according to this image pickup apparatus, even when opening or closing operation of the shutter plate which is being opened or closed is hindered by a finger or the like, the drive transmission mechanism of the output shaft and the motor is isolated by the clutch mechanism and the overload can be prevented from being applied to the motor, thereby making it possible to prevent the shutter mechanism and the like from being broken.

As described above, according to the present invention, there is provided an image pickup apparatus, wherein the clutch mechanism further comprises a gear directly coupled to the motor to rotate and in which the gear and a shaft portion integrally formed with the output shaft are coaxially pivoted to become free, a clutch spring is interposed between the gear and the output shaft and the gear and the clutch spring are engaged with each other with friction.

As described above, according to this image pickup apparatus, since the clutch mechanism includes the gear and the clutch spring which are engaged with each other with friction, the drive transmission system of the output shaft and the motor can be isolated without using a complex mechanism.

As described above, according to the present invention, there is provided an image pickup apparatus, wherein the shaft mechanism has an arrangement in which a shaft aperture formed on one surface of the cam plate is pivotally engaged with a fulcrum shaft of the camera body side and a flange-like shaft portion formed at tip end portion of the output shaft is pivotally engaged with a protrusive expanding slot formed on the other surface of the cam plate.

As described above, according to this image pickup apparatus, the fulcrum shaft of the camera body side, the shaft aperture of the cam plate and the flange-like shaft portion of the output shaft can be aligned with ease by a simple arrangement.

Further, as described above, according to the present invention, there is an image pickup apparatus, wherein the image pickup apparatus issues a warning to users in the form of character display or sounds when the shutter plate is applied with external force so that the shutter plate is kept being opened.

As described above, according to this image pickup apparatus, it is possible for users to recognize, in the form of displayed message or sounds, that the shutter plate is not closed with application of external force.

Further, as described above, according to the present invention, there is provided an image pickup apparatus, wherein the camera body portion has an outer housing of substantially rectangular-solid shape, the outer housing an opening hole formed on an upper portion of one narrow side surface of a width direction, the image pickup lens portion is disposed in the inside of the opening hole and the opening hole is opened and closed by slidably moving the front surface of the image pickup lens portion up and down in the longitudinal direction in the inner surface of the outer housing by the one shutter plate.

As described above, according to this image pickup apparatus, it becomes possible to mount the shutter open and close mechanism in the image pickup apparatus such as, in particular, the video camera in which the surface with the image pickup lens portion attached is oblong and narrow in width. Thus, it becomes possible for the user to operate the ultra-small image pickup apparatus according to the present invention comfortably.

Furthermore, as described above, according to the present invention, there is provided an image pickup apparatus, wherein the cam plate and the drive mechanism for driving the shutter plate are longitudinally disposed substantially in the width of the shutter plate under the opening hole.

Furthermore, as described above, according to the present invention, since the clutch mechanism is disposed in such limited size portion, that is, at the portion of the rotary central shaft of the cam plate to which strongest external force is applied, if the rotation of the shutter plate is hindered by the user's finger or the shutter plate is forcibly opened, then the image pickup apparatus can be used without breaking the drive mechanism.

Having described preferred embodiments of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An image pickup apparatus including an image pickup lens portion disposed on a camera body portion and an openable and closable shutter mechanism serving as a lens cover to protect said image pickup lens portion, comprising:
    said shutter mechanism comprising a drive mechanism including an output shaft rotated by a motor serving as a drive source through a deceleration mechanism;
    a cam plate engaged with said output shaft of said drive mechanism and rotated through a shaft mechanism coaxial with said output shaft;
    a shutter plate engaged with a cam groove of said cam plate and slid up and down vertically relative to said camera body portion to open and close the front surface of said image pickup lens portion; and
    a clutch mechanism provided in said drive mechanism to cut off a drive transmission system of said output shaft and said motor when external force stronger than predetermined external force is applied to said shutter plate which is being opened and closed;
    said clutch mechanism comprising:
    (a) an output gear in a casing and driven by said motor;
    (b) a first gear meshed with said output gear;
    (c) a first worm gear meshed with said first gear at a right angle thereto;
    (d) a second gear mounted on a shaft and meshed with said first worm gear at a right angle thereto;
    (e) a second worm gear mounted on said shaft;
    (f) a third gear mounted on a drive shaft rotatably mounted in said casing and a flange on an output shaft and meshed with said second worm gear; and
    (g) a clutch spring interposed between said third gear and said flange such that said third gear and said flange are engaged with each other in friction.

2. An image pickup apparatus according to claim 1, wherein said shaft mechanism has an arrangement in which a shaft aperture formed on one surface of said cam plate is pivotally engaged with a fulcrum shaft of said camera body side and a flange-like shaft portion formed at tip end portion of said output shaft is pivotally engaged with a protrusive expanding slot formed on the other surface of said cam plate.

3. An image pickup apparatus according to claim 1, wherein said image pickup apparatus issues a warning to users in the form of character display or sounds when said shutter plate is applied with external force so that said shutter plate is kept being opened.

4. An image pickup apparatus according to claim 1, wherein said camera body portion has an outer housing of substantially rectangular-solid shape, said outer housing an opening hole formed on an upper portion of one narrow side surface of a width direction, said image pickup lens portion is disposed in the inside of said opening hole and said opening hole is opened and closed by slidably moving the front surface of said image pickup lens portion up and down in the longitudinal direction in the inner surface of said outer housing by said one shutter plate.

5. An image pickup apparatus according to claim 4, wherein said cam plate and said drive mechanism for driving said shutter plate are longitudinally disposed substantially in the width of said shutter plate under said opening hole.

* * * * *